(12) United States Patent
Subotic

(10) Patent No.: US 10,428,921 B2
(45) Date of Patent: Oct. 1, 2019

(54) TORQUE CONVERTER IMPELLER INCLUDING PROTRUSIONS FOR CENTERING THE STATOR

(71) Applicant: Schaeffler Technologies AG & Co. KG, Herzogenaurach (DE)

(72) Inventor: Jasmina Subotic, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 551 days.

(21) Appl. No.: 15/057,560

(22) Filed: Mar. 1, 2016

(65) Prior Publication Data

US 2017/0254397 A1    Sep. 7, 2017

(51) Int. Cl.
*F16H 41/24* (2006.01)
*F01D 5/02* (2006.01)
*F16H 41/28* (2006.01)

(52) U.S. Cl.
CPC ............ *F16H 41/24* (2013.01); *F01D 5/027* (2013.01); *F16H 41/28* (2013.01); *F05D 2230/60* (2013.01)

(58) Field of Classification Search
CPC .... F16H 41/24; F16H 41/28; F16H 2041/285; F01D 5/27; F05D 2230/60
See application file for complete search history.

(56) References Cited

U.S. PATENT DOCUMENTS

| | | | | |
|---|---|---|---|---|
| 2,839,826 | A | * | 6/1958 | Farrell ..................... C23C 6/00 164/111 |
| 6,508,345 | B1 | * | 1/2003 | Yoshimoto ................ F16H 3/16 192/105 R |
| 2004/0026201 | A1 | * | 2/2004 | Imasaka .................. F16H 41/28 192/3.23 |
| 2008/0029359 | A1 | * | 2/2008 | Takada .................... F16H 41/24 192/3.29 |
| 2012/0217113 | A1 | * | 8/2012 | Kawahara ......... F16F 15/13484 192/3.21 |
| 2015/0125290 | A1 | | 5/2015 | Dattawadkar |
| 2015/0369069 | A1 | | 12/2015 | Smith et al. |
| 2016/0290461 | A1 | * | 10/2016 | Momiyama ............. F16H 41/28 |

\* cited by examiner

*Primary Examiner* — Jacob S. Scott
*Assistant Examiner* — Lori Wu
(74) *Attorney, Agent, or Firm* — Davidson, Davidson & Kappel, LLC

(57) ABSTRACT

A torque converter is provided. The torque converter includes a stator including a body and a plurality of blades on an outer circumferential surface of the body and an impeller including an impeller shell. The impeller shell includes at least one protrusion aligned for contacting an axially extending surface of the body of the stator to center the stator on the impeller during assembly. A method of forming a torque converter is also provided. The method includes forming an impeller shell to include at least one protrusion on a stator facing surface thereof; providing a stator including a body and a plurality of blades on an outer circumferential surface of the body; and centering the stator on the impeller shell by contacting the at least one protrusion with an axially extending surface of the body.

15 Claims, 4 Drawing Sheets

TORQUE CONVERTER IMPELLER INCLUDING PROTRUSIONS FOR CENTERING THE STATOR

The present disclosure relates generally to torque converters and more specifically to the centering of stators in torque converters.

BACKGROUND

During install of a torque converter into a transmission, it is known to align and then engage an input shaft, stator shaft, and pump gear for the transmission to a turbine hub, stator hub, and impeller hub, respectively, for the torque converter. It is known to center the stator via axially extending rims formed at the inner diameters of turbine and impeller core rings contacting the outer diameter of the stator rim during installation.

Further U.S. Publication No.: 2015/0369069 discloses a particular turbine shell profile for interfacing with a particular stator casting profile to radially center the stator. U.S. Publication No.: 2015/0125290 discloses an impeller core including tabs for centering the stator.

SUMMARY OF THE INVENTION

A torque converter is provided. The torque converter includes a stator including a body and a plurality of blades on an outer circumferential surface of the body and an impeller including an impeller shell. The impeller shell includes at least one protrusion aligned for contacting an axially extending surface of the body of the stator to center the stator on the impeller during assembly.

A method of forming a torque converter is also provided. The method includes forming an impeller shell to include at least one protrusion on a stator facing surface thereof; providing a stator including a body and a plurality of blades on an outer circumferential surface of the body; and centering the stator on the impeller shell by contacting the at least one protrusion with an axially extending surface of the body.

BRIEF DESCRIPTION OF THE DRAWINGS

The present invention is described below by reference to the following drawings, in which.

DETAILED DESCRIPTION

The disclosure provides method of centering a torque converter stator during installation by adding rivets or embossments to the impeller shell. In some embodiments, the rivets on impeller shell may also be used for centering a thrust washer or bearing.

Figure 1:
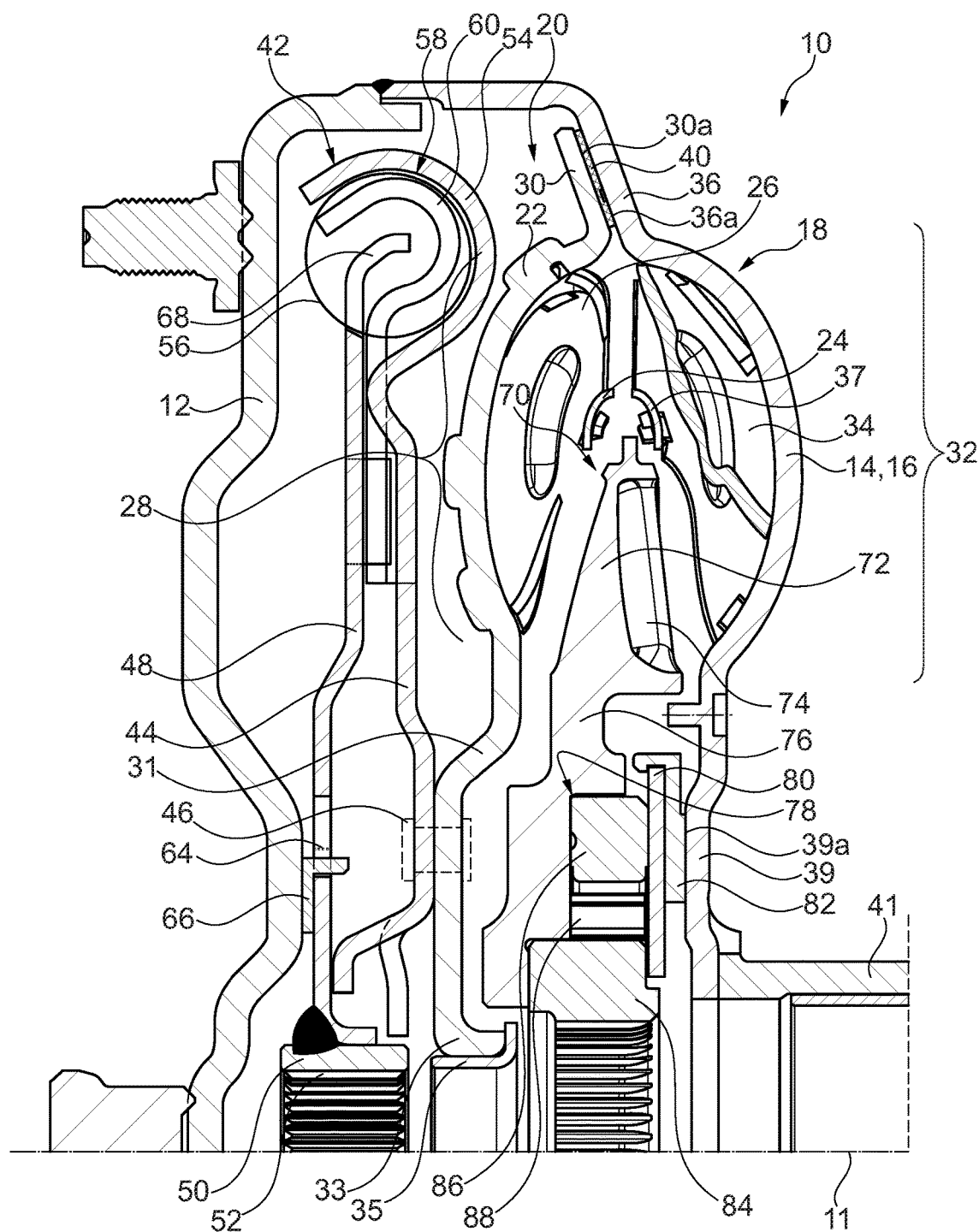
FIG. 1 shows a cross-sectional side view of a torque converter according to an embodiment of the present invention.

FIG. 1 shows a cross-sectional side view of a torque converter 10 in accordance with an embodiment of the present invention. Torque converter 10 is rotatable about a center axis 11 and includes a front cover 12 for connecting to a crankshaft of an internal combustion engine and a rear cover 14 forming a shell 16 of an impeller or pump 18. The terms axially, radially and circumferentially as used herein are used with respect to center axis 11. Torque converter 10 also includes a turbine 20 configured to define a piston that is axially moveable toward and away from impeller 18 to engage and disengage an impeller clutch of impeller 18 so as to form a lockup clutch. Turbine 20 includes a turbine shell 22 and a core ring 24 supporting a plurality of turbine blades 26 therebetween. Blades 26 are fixed at an engine side thereof to turbine shell 22 by tabs and are each fixed to core ring 24 at a transmission side thereof by tabs. In this embodiment, core ring 24 does not include an axially extending rim formed at the inner diameters thereof.

Turbine shell 22 includes a rounded blade supporting portion 28, which is shaped as an annular bowl, for contacting engine side edges of turbine blades 26. Radially outside of blade supporting portion 28, an outer radial extension 30, which forms the piston, radially protrudes outwardly from an outer circumference of blade supporting portion 28 to define an annular protrusion having a flat annular radially extending impeller facing surface 30a and having an outermost circumference that defines an outermost circumference of turbine 20. Accordingly, the piston and turbine shell 22 are formed as a single piece. Radially inside of blade supporting portion 28, turbine shell 22 includes an annular inner radial extension 31 that, at an inner radial end thereof, joins an axially extending inner circumferential section 33, whose inner circumferential surface contacts an outer circumferential surface of a hub 35.

Impeller 18 includes impeller blades 34, which are each fixed at a transmission side thereof to impeller shell 16 and are each fixed to an impeller core ring 37 at an engine side thereof by tabs. In this embodiment, core ring 37 does not include an axially extending rim formed at the inner diameters thereof. Impeller shell 16 includes a rounded blade supporting portion 32, which is shaped as an annular bowl, for contacting transmission side edges of impeller blades 34. Radially outside of blade supporting portion 32, a radially extending wall 36, which forms an impeller clutch, radially protrudes outwardly from an outer circumference of rounded blade supporting portion 32 to define an annular wall having a flat annular radially extending turbine facing surface 36a. Accordingly, the impeller clutch and impeller shell 16 are formed as a single piece. Radially inside of blade supporting portion 32, impeller shell 16 includes an annular inner radial extension 39 extending radially inward from blade supporting portion 32. A radially inner end of extension 39 is connected to an impeller hub 41.

A friction material 40 is bonded onto radially extending impeller facing surface 30a of outer radial extension 30 for engaging radially extending wall 36. In other embodiments, instead of or in addition to being bonded to outer radial extension 30, friction material 40 may be bonded to radially extending turbine facing surface 36a of radially extending wall 36. Regardless of whether friction material 40 is bonded to outer radial extension 30 or radially extending wall 36, friction material 40 is provided axially between surfaces 30a, 36a.

A damper assembly 42 is positioned between front cover 12 and turbine 20 and is configured for transferring torque from turbine 20 to a transmission input shaft. Damper assembly 42 includes two plates—a first or turbine side plate 44, which is riveted to turbine 20 by rivets 46, and a second or front side plate 48, which is connected to a hub 50 having an inner splined surface 52 configured for connecting to a transmission input shaft.

At a radially outer end thereof, first plate 44 includes a spring retainer 54 configured for retaining arc springs 56. Spring retainer 54 includes circumferentially extending arc shaped pockets 58, each for receiving one arc spring 56, with each arc shaped pocket 58 having an inner surface contoured to an outer surface of the corresponding arc spring 56. Circumferentially between pockets 58, radially outer end of first plate 44 includes drive tabs 60. Each drive tab 60 is configured for contacting one circumferential edge of each arc springs 56 and is axially and radially offset with respect to pockets 58.

Second plate 48 is provided with holes 64 axially extending therethrough for decreasing an axial stiffness of plate 48 and for receiving posts of an axial thrust washer 66, which is sandwiched axially between an inner radially extending surface of front cover 12 and second plate 48. At a radially outer end thereof, second plate 48 includes a plurality of circumferentially spaced driven tabs 68 configured for extending axially into spaces circumferentially between springs 56 such that each driven tab 68 contacts one circumferential edge of each arc springs 56. Each arc spring 56 is thus held circumferentially between one drive tab 60 and one driven tab 68. During operation of torque converter 10, first plate 44 transfers torque from turbine 20 to second plate 48 via drive tabs 60 transferring torque to driven tabs 68 via springs 56. Second plate 48 in turn transfers torque to the transmission input shaft via inner splined surface 52 of hub 50.

Torque converter 10 also includes a stator 70 axially between turbine 20 and impeller 18 to redirect fluid flowing from the turbine blades 26 before the fluid reaches impeller 18 to increase the efficiency of torque converter 10. Stator 70 includes stator casting 72 including a plurality of blades 74 and a stator body 76. Stator 70 also includes a one-way clutch 78 held within stator body 76 by a centering plate 80. An axial thrust washer 82, which is axially between stator 70 and impeller 18, is fixed to stator 70 at an outer circumference of centering plate 80. One-way clutch 78 includes an inner race 84, an outer race 86 and rollers 88 radially between inner race 84 and outer race 86. Stator casting 72 is rotationally fixed to outer race 86, and depending on the operating conditions of torque converter 10, inner race 84 and outer race 86 are rotationally fixed to each other or rotatable relative to each other.

Figure 2:
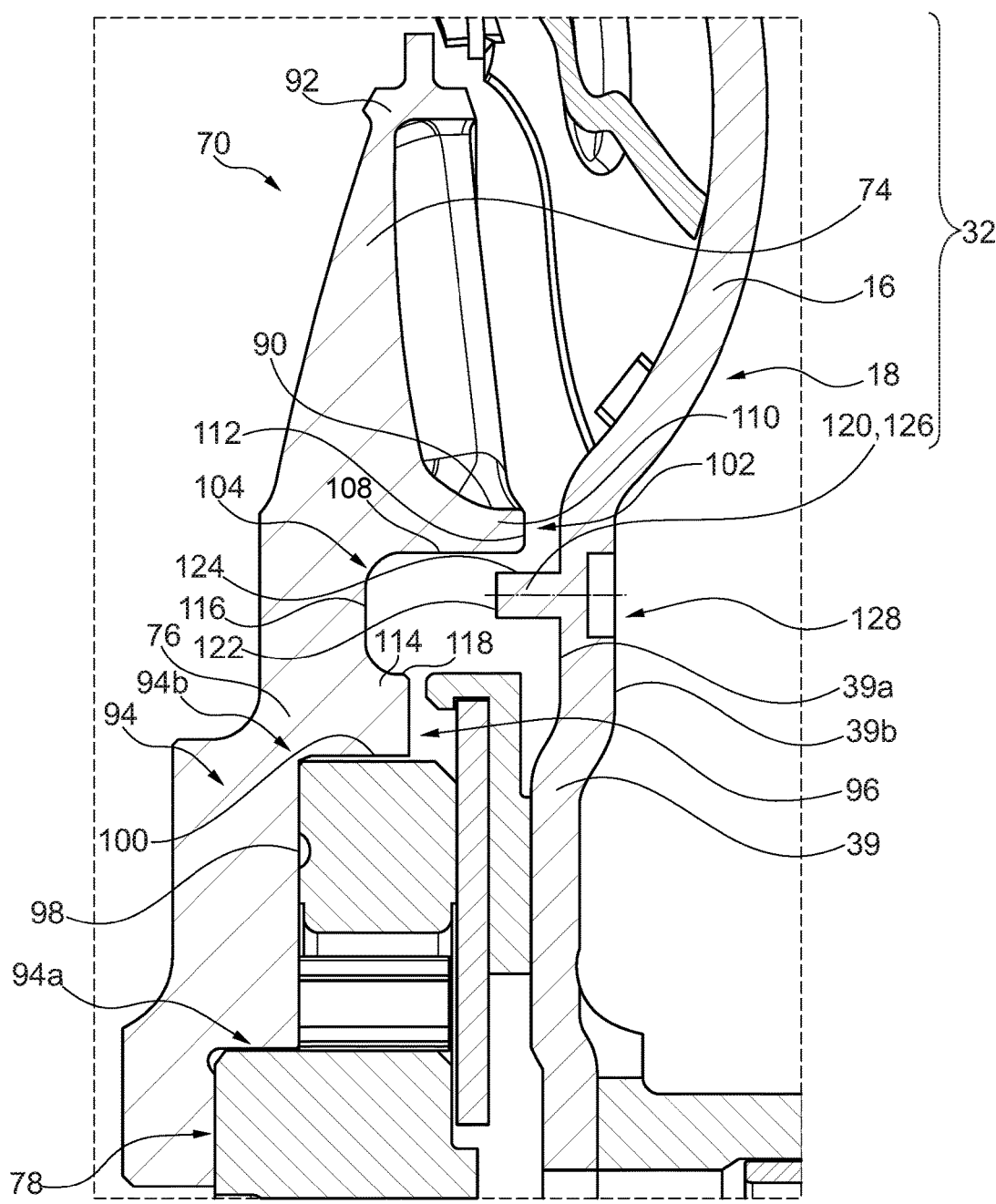
FIG. 2 shows an enlarged cross-sectional side view of a stator and a portion of an impeller of the torque converter shown in FIG. 1.

FIG. 2 shows an enlarged cross-sectional side view of stator 70 and a section of impeller 18. Blades 74 are supported radially between an outer circumferential surface 90 of stator body 76 and an inner circumferential surface of a brim 92. Stator body 76 includes an annular recess 94 formed in an impeller-side 96 thereof receiving one-way clutch 78. Annular recess 94 is defined by two step portions—a radially inner step portion 94a receiving inner race 84 and a radially outer step portion 94b receiving outer race 86. Radially outer step portion 94b includes a radially extending surface 98 and an axially extending circumferential surface 100 extending from a radially outer edge of radially extending surface 98. Radially outside of annular recess 94, stator casting 72 is provided with a pocket 102 defining an annular groove 104 within stator body 76. More specifically, pocket 102 is formed radially inside of outer circumferential surface 90 of stator body 76 and radially outside of axially extending circumferential surface 100, which defines the outermost circumferential surface of annular recess 94. Groove 104 extends circumferentially about center axis 11 (FIG. 1) and an outer circumference of groove 104 is defined by an axially extending circumferential surface 108 of an axially protruding ring 110. An outer circumferential surface of a first axially protruding ring 110 defines outer circumferential surface 90 of stator body 76 and axially protruding ring 110 includes a radially extending surface 112 extending radially outward from axially extending circumferential surface 108 to outer circumferential surface 90. Pocket 102 is defined by first axially protruding ring 110 and a second axially protruding ring 114 and further includes a radially extending surface 116 extending radially inward from axially extending circumferential surface 108 and an axially extending inner circumferential surface 118 extending axially from an inner diameter of radially extending surface 116.

In accordance with an embodiment of the present invention, impeller shell 18 is provided with at least one axially extending protrusion 120 for centering stator 70 on impeller 16 during assembly of torque converter 10. In a preferred embodiment, the at least one axially extending protrusion 120 includes a plurality of protrusions 120 are circumferentially spaced from each other about center axis 11 (FIG. 1). Protrusions 120, which are aligned radially inside of stator blades 74 and radially outside of one-way clutch 78, are formed on a stator-facing radially extending surface 39a of annular inner radial extension 39. Radially extending surface 39a is flat and extends perpendicular to center axis 11 (FIG. 1) and protrusions 120 extend axially away from radially extending surface 39a toward stator 70. Protrusions 120 are formed radially inside of axially extending surface 108 of protruding ring 110 and an axial tip 122 of each protrusion 120 is positioned within annular groove 104, by axial tip 122 extending away from surface 39a axially past radially extending surface 112 of ring 110, such that protrusions 120 are configured for centering stator 70 with impeller 18 during assembly of torque converter 10. More specifically, a radially outer axially extending surface 124 of each protrusion 120 may contact axially extending surface 108 of stator 70 during assembly to properly center stator 70.

In this embodiment, protrusions 120 are formed as extruded rivets 126. Extruded rivets 126 are formed by extruding impeller shell 16. More specifically, a riveting tool extrudes annular inner radial extension 39 by contacting a transmission-facing radially extending surface 39b of annular inner radial extension 39 such that an indentation 128 is formed in transmission-facing radially extending surface 39b and protrusion 120 is formed. After protrusions 120 are formed, stator 70 is centered on impeller 16 by centering axially extending surface 108 radially outside of protrusions 120.

Figure 3:
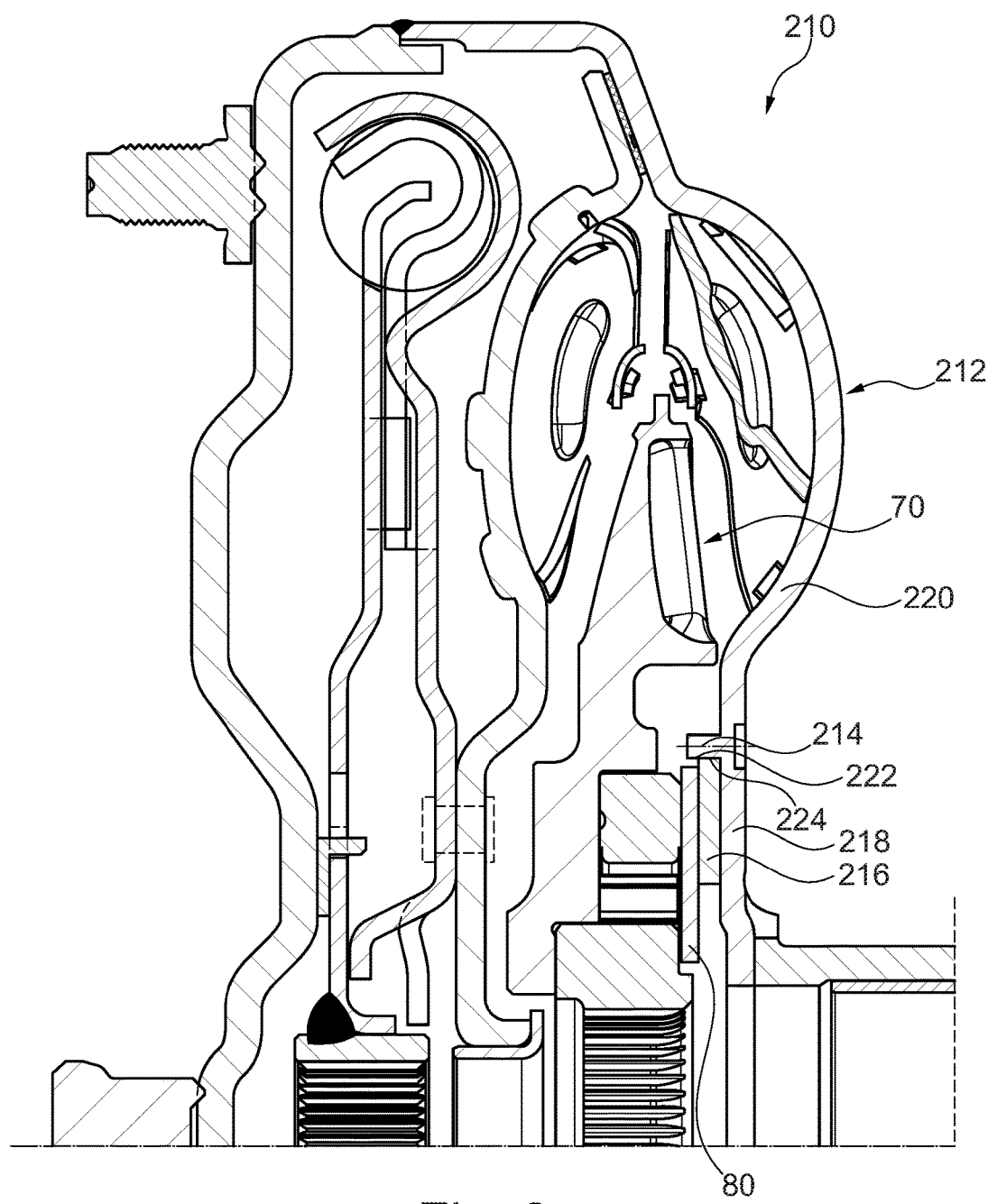
FIG. 3 shows a cross-sectional side view of a torque converter according to another embodiment of the present invention.

FIG. 3 shows a cross-sectional side view of a torque converter 210 in accordance with another embodiment of the present invention. Torque converter 210 is formed in the same manner as torque converter 10, except that impeller 212 is provided with protrusions/rivets 214 that, in addition to centering stator 70 with impeller 212 during assembly of torque converter 10, are used to center a thrust washer or bearing 216 positioned axially between impeller 212 and stator 70. More specifically, thrust washer or bearing 216 is sandwiched axially between centering plate 80 of stator 70 and annular inner radial extension 218 of impeller shell 220. Rivets 214 include an inner radial axially extending surface 222 of rivet 214 that is machined that have a smooth arc shaped that contours to an outer circumferential surface 224 of thrust washer or bearing 216, which is ring shaped. Rivets 214 may pilot thrust washer or bearing 216 or help with extended piloting to prevent thrust washer or bearing 216 from falling off during torque converter ballooning under loading conditions. Stator 70 may be indirectly centered by rivets 214 by rivets 214 centering thrust washer or bearing 216, and then by thrust washer or bearing 216 being attached to centering plate 80, thus centering stator 70.

Figure 4:
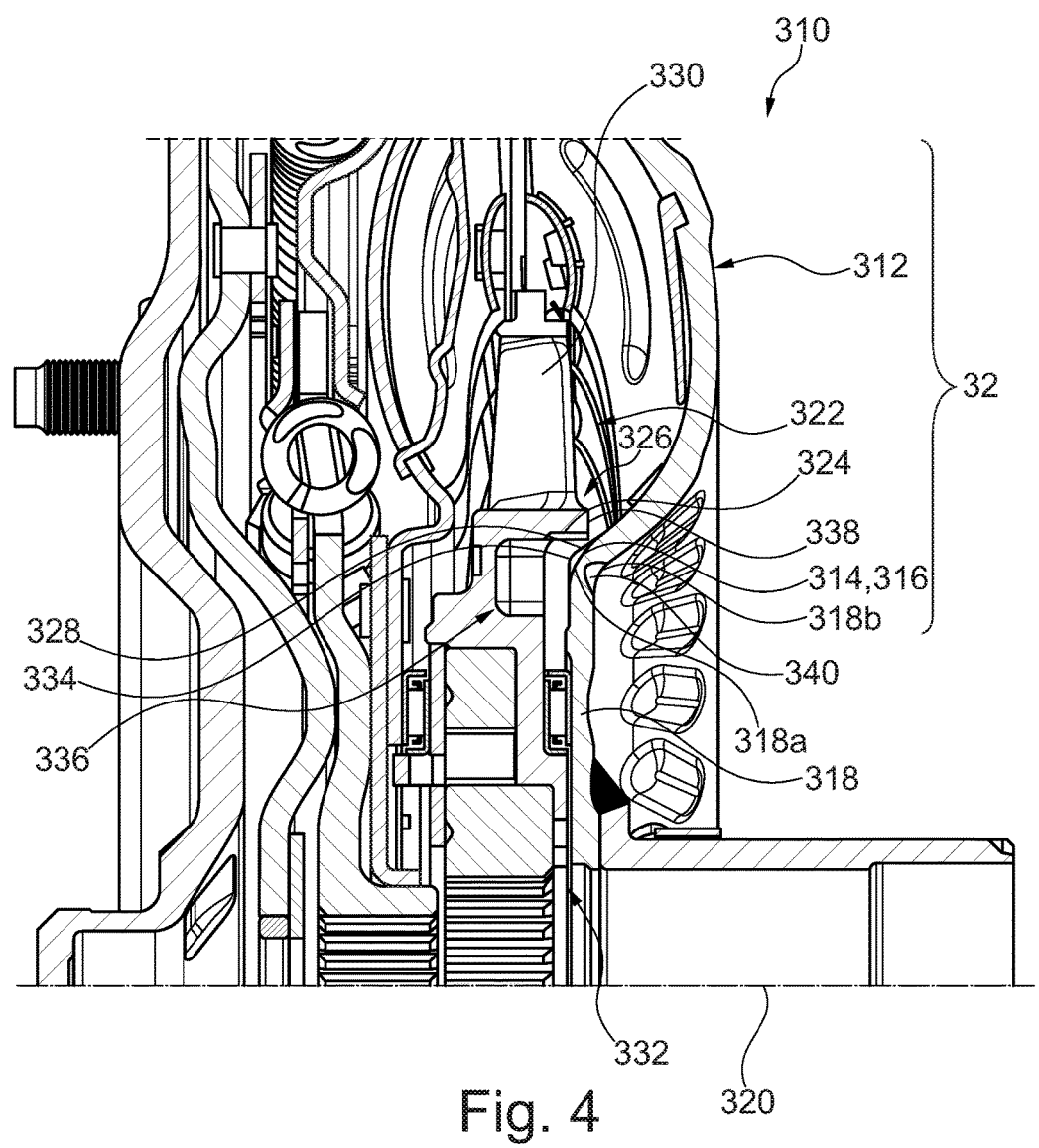
FIG. 4 shows a cross-sectional side view of a torque converter according to another embodiment of the present invention.

FIG. 4 shows a cross-sectional side view of a torque converter 310 in accordance with another embodiment of the present invention. Impeller 312 of torque converter 310 is formed in substantially the same manner as impeller 18, except that impeller 312 is provided with at least one protrusion 314 in the form of at least one embossment 316 and the location of the at least one protrusion 314 is formed further radially outside in comparison to the at least one protrusion 120 on annular inner radial extension 318. In a preferred embodiment, the at least one axially extending protrusion 314 includes a plurality of protrusions 314 are circumferentially spaced from each other about center axis 320. Stator 322 is formed in substantially the same manner as stator 70, except that an axially extending inner circumferential surface 324 of protruding ring 326 of stator 322 is machined to provide a tapering at each of embossments 316 that matches a tapering of a radially outer axially extending surface 328 of embossments 316.

Protrusions 314 are aligned radially inside of stator blades 330 and radially outside of one-way clutch 332 and are formed on a curved stator-facing radially extending surface 318a of annular inner radial extension 318 where inner radial extension joins rounded blade supporting portion 32 of impeller 312. Protrusions 314 extend axially away from radially extending surface 318a toward stator 70. Protrusions 314 are formed radially inside of axially extending surface 324 of protruding ring 326 and an axial tip 334 of each protrusion 314 is positioned within annular groove 336, by axial tip 334 extending away from surface 318a axially past radially extending surface 338 of ring 326, such that protrusions 314 are configured for centering stator 322 with impeller 312 during assembly of torque converter 310. More specifically, radially outer axially extending surface 328 of each protrusion 314 may contact axially extending surface 324 of stator 322 during assembly to properly center stator 322.

Protrusions 314 are formed by an embossing tool embossing annular inner radial extension 318 by contacting a transmission-facing radially extending surface 318b of annular inner radial extension 318 such that an indentation 340 is formed in transmission-facing radially extending surface 318b and protrusion 314 is formed. After protrusions 314 are formed, stator 322 is centered on impeller 312 by centering axially extending surface 324 radially outside of protrusions 314.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A torque converter comprising:
a stator including a stator body, a plurality of stator blades on an outer circumferential surface of the stator body, and a one-way clutch held within the stator body; and
an impeller including an impeller shell, the impeller shell including a plurality of circumferentially spaced protrusions aligned for contacting an axially extending surface of the stator body to center the stator on the impeller during assembly, the plurality of circumferentially spaced protrusions being aligned radially inside of the stator blades and radially outside of the one-way clutch.

2. The torque converter as recited in claim 1 wherein the impeller shell includes a plurality of impeller blades, a rounded blade supporting portion contacting the impeller blades and an annular inner radial extension extending radially inward from the rounded blade supporting portion, the annular inner radial extension including the plurality of circumferentially spaced protrusions.

3. The torque converter as recited in claim 2 wherein the annular inner radial extension includes a stator-facing radially extending surface connected to the plurality of circumferentially spaced protrusions, the plurality of circumferentially spaced protrusions extending axially away from the stator-facing radially extending surface toward the stator.

4. The torque converter as recited in claim 3 wherein the stator-facing radially extending surface is flat.

5. The torque converter as recited in claim 2 wherein the impeller includes an impeller hub, the annular inner radial extension extending radially inward from the rounded blade supporting portion to the impeller hub, the plurality of circumferentially spaced protrusions being positioned radially outward from the impeller hub and radially inward from the rounded blade supporting portion.

6. The torque converter as recited in claim 1 wherein the plurality of circumferentially spaced protrusion are formed by a plurality of extruded rivets.

7. The torque converter as recited in claim 6 wherein an indentation is formed for each extruded rivet in a transmission-facing radially extending surface of the impeller shell.

8. The torque converter as recited in claim 1 wherein the plurality of circumferentially spaced protrusions are formed by a plurality of embossments.

9. The torque converter as recited in claim 1 wherein the stator body includes an annular groove, the plurality of circumferentially spaced protrusions extending axially into the annular groove.

10. The torque converter as recited in claim 1 wherein the stator body includes an axially protruding ring including the axially extending surface, the plurality of circumferentially spaced protrusions being radially inside of the axially protruding ring.

11. The torque converter as recited in claim 1 further comprising a thrust washer or bearing, each of the plurality of circumferentially spaced protrusions including an inner radial surface contacting an outer circumferential surface of the thrust washer or bearing to center the thrust washer or bearing on the impeller.

12. The torque converter as recited in claim 1 wherein the each of the plurality of circumferentially spaced protrusions includes a radially outer axially extending surface, a radially inner axially extending surface and an axial tip between the radially outer axially extending surface and the radially inner axially extending surface.

13. The torque converter as recited in claim 1 wherein the stator body includes a first axially extending surface and a second axially extending surface radially inward from the first axially extending surface, the first and second axially extending surfaces defining an annular groove, an axial tip of each of the plurality of circumferentially spaced protrusions being positioned within the annular groove.

14. A torque converter comprising:
a stator including a stator body, a plurality of stator blades on an outer circumferential surface of the stator body, and a one-way clutch held within the stator body; and
an impeller including an impeller shell, the impeller shell including at least one protrusion aligned for contacting an axially extending surface of the stator body to center the stator on the impeller during assembly, the at least one protrusion being aligned radially inside of the stator blades and radially outside of the one-way clutch,
wherein the stator body includes an annular groove, the at least one protrusion extending axially into the annular groove.

15. The torque converter as recited in claim 14 wherein the stator body includes a first axially extending surface and a second axially extending surface radially inward from the first axially extending surface, the first and second axially extending surfaces defining the annular groove, an axial tip of the at least one protrusion being positioned within the annular groove.

* * * * *